June 24, 1947.  J. W. FEILD  2,422,663
LIQUID FLOW CALCULATOR
Filed March 1, 1946  4 Sheets-Sheet 1

Inventor
JAMES W. FEILD

Attorney

June 24, 1947. J. W. FEILD 2,422,663
LIQUID FLOW CALCULATOR
Filed March 1, 1946 4 Sheets-Sheet 2

Inventor
JAMES W. FEILD

June 24, 1947.  J. W. FEILD  2,422,663
LIQUID FLOW CALCULATOR
Filed March 1, 1946  4 Sheets-Sheet 3
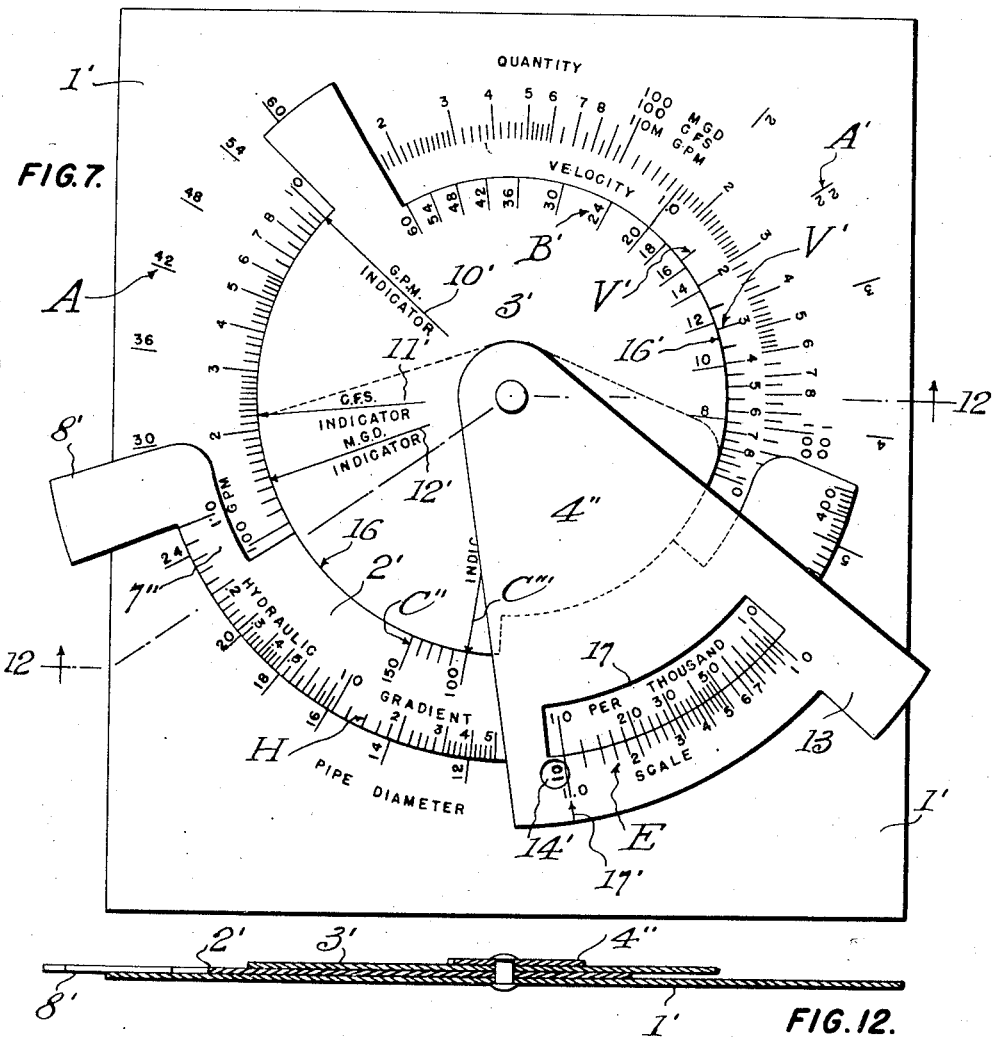
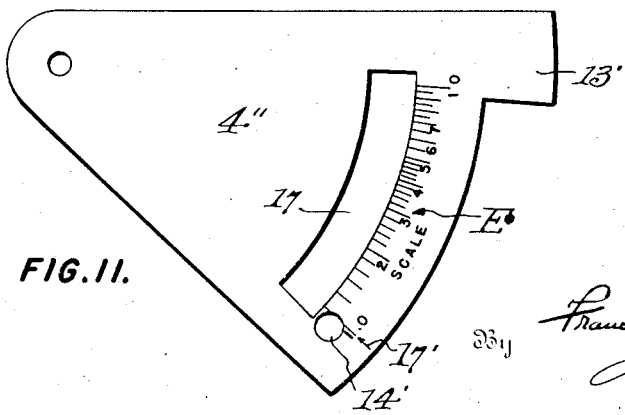
Inventor
JAMES W. FEILD

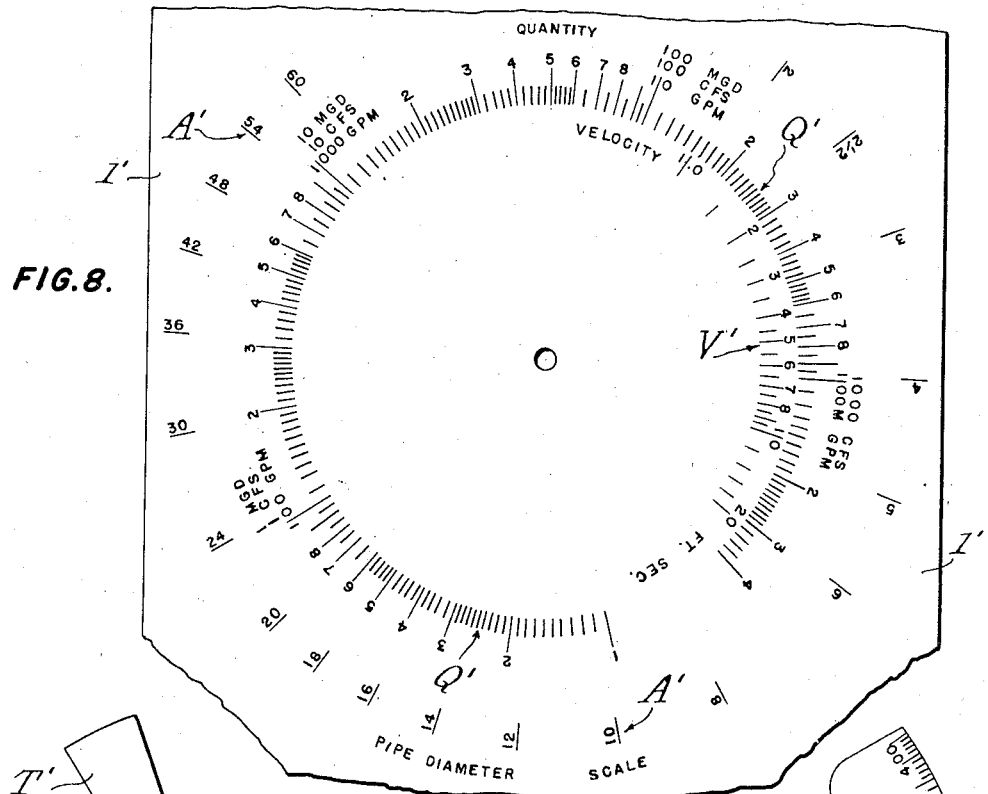
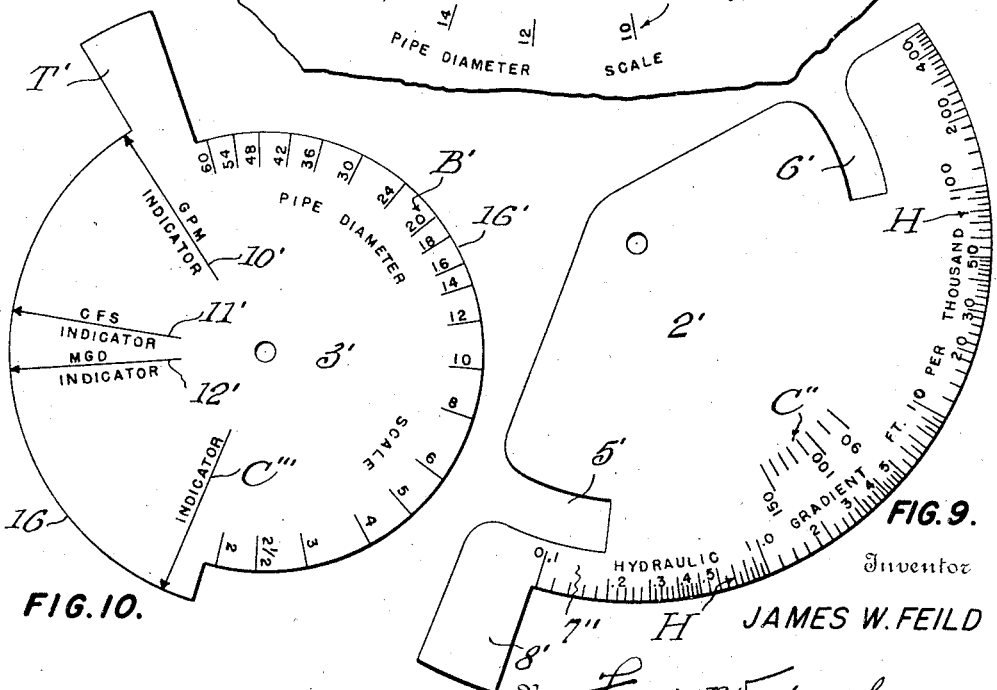

Patented June 24, 1947

2,422,663

UNITED STATES PATENT OFFICE 2,422,663

LIQUID FLOW CALCULATOR

James W. Feild, Alexandria, Va.

Application March 1, 1946, Serial No. 651,407

7 Claims. (Cl. 235—84)

(Granted under the act of March 3, 1883, as amended April 30, 1928; 370 O. G. 757)

The invention described herein may be manufactured and used by or for the Government for governmental purposes, without payment to me of any royalty thereon.

This invention relates to calculators and more particularly to an improved calculator which is especially adapted to solve problems relating to the flow of liquid in pipes.

One of the principal objects of the invention is to provide a calculator for quickly and accurately solving problems involving the flow of liquid in pipes without the necessity of performing complicated mathematical calculations.

Another object is to provide a device of the class described which has a wide range of operations for solving problems involving sizes of the pipes, quantities of liquid, velocities of flow, slopes of the pipes, etc.

Still another object of the invention is to provide a flow calculator for pipes which is simple and compact, of convenient size, and constructed of a minimum number of relatively adjustable parts, each capable of performing multiple functions in solving problems relating to the flow of liquids in pipes.

Heretofore, in solving problems, relating to the flow of liquid in pipes, the use of logarithms, slide rules, flow tables, or flow charts were required. Flow tables can be as accurate as the formula by which they are computed, but they are inconvenient to use, generally requiring interpolation or multiplication by some factor or both.

The method in current use which could compare most favorably with the calculator of this invention, as regards speed, is the use of flow charts. On flow charts the related factors are widely separated and the use of guide lines or a straight edge is necessary in reading the chart. Also, if each flow chart is prepared in the customary manner on logarithmic cross-section paper, and if given the range and degree of accuracy for various friction coefficients, it would of necessity be approximately six times as large as the present calculator. Charts of such size are inconvenient to use and to file.

It is therefore the aim and purpose of this invention to attain the foregoing objectives by setting known factors into the calculator, thus eliminating the necessity for numerous trial computations.

With the above and other objects and advantages in view the invention consists of certain features of construction and operation of parts which will hereinafter be described and shown in the accompanying drawings in which:

Figure 7 is a top plan assembly view of another form of the calculator for solving problems relating to pressure flow of liquids through pipes;

Figure 8 is a detail plan view of the base member thereof;

Figure 9 is a detail plan view of its intermediate member;

Figure 10 is a detail plan view of a third member of the pressure flow calculator;

Figure 11 is a detail plan view of a top member thereof; and

Figure 12 is a cross-sectional view through the pressure flow calculator taken on line 12—12 of Figure 7.

The problems connected with the flow of liquids in pipes fall into one of two main categories, namely:

A. Gravity flow or free flow under the influence of gravity, and

B. Pressure flow or flow under influences other than gravity, such as by pump, hydrostatic pressure, pneumatic pressure, etc.

As previously stated, Figs. 1 to 6, inclusive, of the drawings are directed to one form of the device for solving problems relating to gravity flow of liquids in pipes, and Figs. 7 to 12, inclusive, are directed to solving problems relating to flow of liquids under pressure through pipes or under influences other than gravity.

Figure 1:
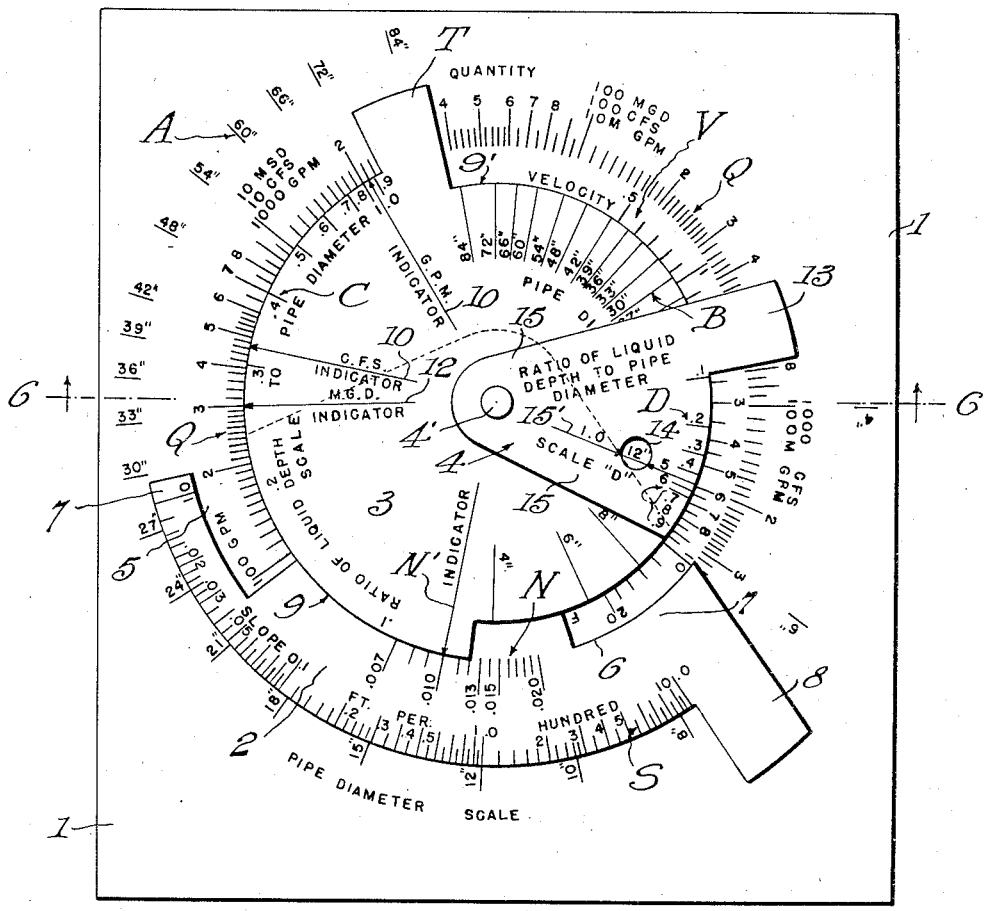
Figure 1 is a top plan assembly view of one form of the calculator for solving problems relating to gravity flow of liquid through pipes.
Figure 6:
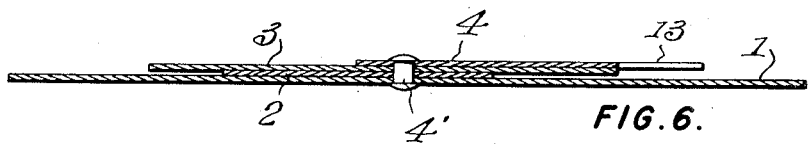
Figure 6 is a cross-sectional view of the gravity flow calculator taken on line 6—6 of Figure 1.
Figure 5:
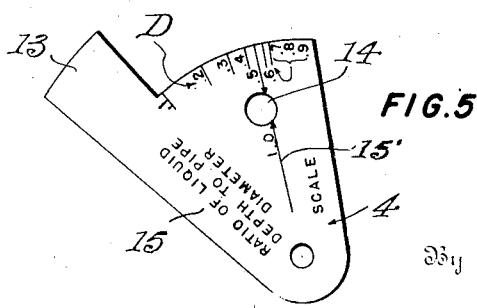
Figure 5 is a detail plan view of a top member.
Figure 2:
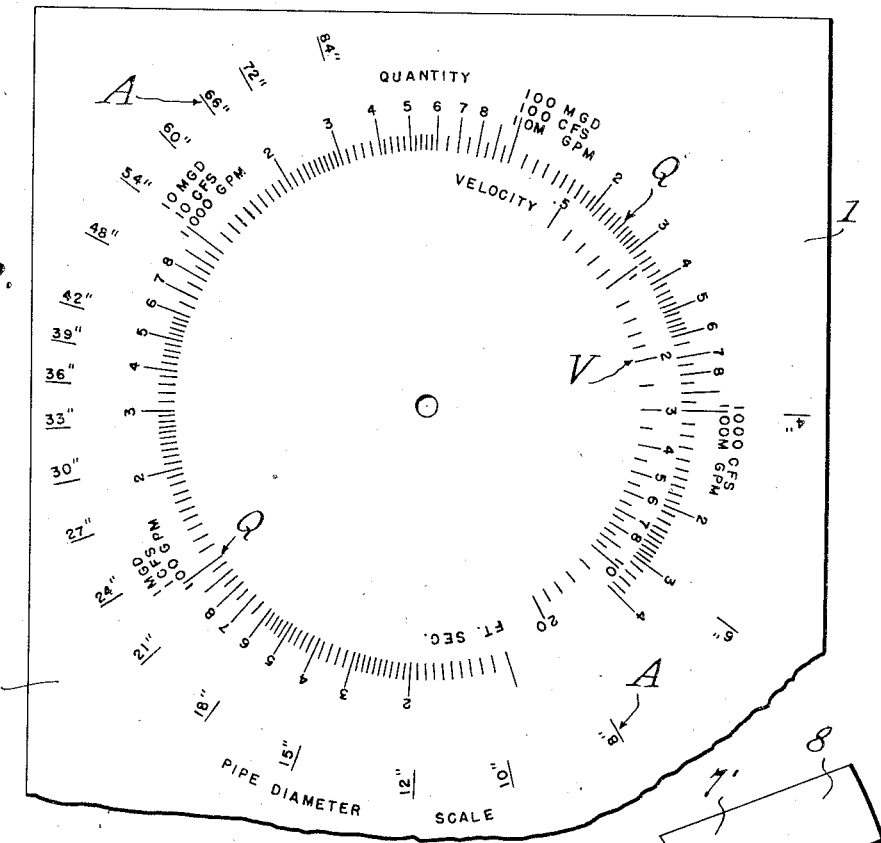
Figure 2 is a detail plan view of a base member of the gravity flow calculator.
Figure 4:
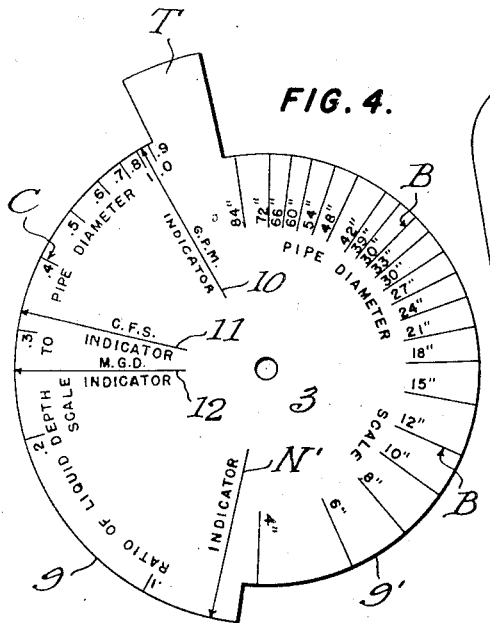
Figure 4 is a detail plan view of a third member.
Figure 3:
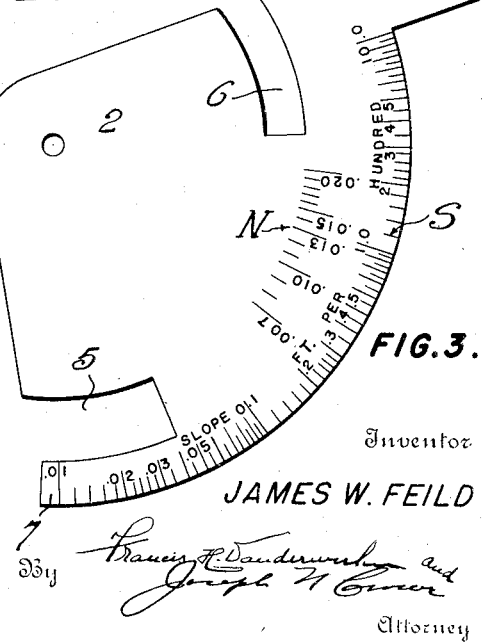
Figure 3 is a detail plan view of an intermediate member thereof.

Referring more specifically to the drawings, Fig. 1 is an assembly view of the calculator embodying the invention for solving problems relating to gravity flow of liquids in pipes, said calculator comprising a rectangularly shaped base plate 1 shown in detail in Fig. 2, a segmental disc section 2 shown in detail in Fig. 3, a third disc-like member 3 shown in detail in Fig. 4 and a top arm 4 shown in detail in Fig. 5. The intermediate member 2 and disc-like member 3 together with the arm 4 are all rotatable about a common pivot 4', with the segmental disc section 2 mounted to rotate over the base plate 1, the disc-like member 3 mounted to rotate over the segmental disc section 2 and the arm 4 mounted to rotate over the disc-like member 3.

The four component members 1 to 4, inclusive, of the improved calculator are constructed of any suitable material such as Celluloid or plastic which will be durable and sufficiently stiff to hold its shape and on which scales, indicators, lettering, etc., can be satisfactorily engraved, photo-printed or otherwise indelibly printed.

The base plate 1 in Fig. 2 has an outer scale A, an intermediate scale Q and an inner scale V provided thereon graduated along arcs of concentric circles. The outer scale A is for the selection of pipe sizes when the quantity of flow, slope and friction factors are known and represents in inches the diameter of pipes commonly used in sewer systems.

The intermediate scale Q is the quantity scale or flow scale and is used either directly or indirectly in connection with all of the other scales. The quantity is represented in the commonly used units; namely, gallons per minute (G. P. M.) cubic feet per second (C. F. S.), and million gallons per day (M. G. D.). The method of using one scale to represent the different units of quantity will be hereinafter described in connection with flow indicators on the disc or member 3, Fig. 4.

The next or innermost scale V on the base plate 1 is the velocity scale representing feet per second and is used in conjunction with a scale B on one side of the disc 3, Fig. 4, to determine the velocity in the pipe of selected diameter when flowing full and discharging the quantity of liquid indicated by the flow indicators on Fig. 4, or to determine the required pipe size necessary to produce a given velocity of flow under these conditions.

The segmental disc section 2 shown in detail in Fig. 3 is provided with notches or recesses 5 and 6 adjacent to the outer periphery and on the side edges thereof. The recess 5 has a greater width than the recess 6 and is also nearer the outer periphery of the disc section, whereby arcuate tongues 7 and 7' having different widths are provided on the disc section 2, with the tongues extending in opposite directions from each other. A finger engaging portion 8 is also provided on the disc section 2, said portion extending outwardly from the end of the tongue 7'. The disc section 2 is of a radius that its circumference falls just inside of scale A on the base plate 1 and has an outer scale S and an inner scale N. The outer scale S represents the slope of the pipe in feet per hundred and is adapted to coact with the pipe diameter scale A on the base plate 1 for a purpose which will hereinafter be described and the inner scale N is the friction factor scale and is adapted to coact with indicators on the disc-like member 3 for a purpose which will hereinafter appear. The recess 5 having the greatest width on the disc section 2 overlies the quantity scale Q on base plate 1 and permits this scale Q to be read therethrough and the recess 6 overlies the velocity scale V and permits the scale V to be read therethrough.

The third disc-like member 3, Figs. 1 and 4, has portions 9 and 9' of different radius and an ear or tab T which extends radially from the member 3. The portion 9 of the member 3, Figs. 1 and 4, which has the maximum radius is provided with a concentric scale C around its periphery, which cooperates with the quantity scale Q on the base plate 1 and the portion 9' of the member 3 of least radius is provided with a concentric scale B on its periphery representing pipe diameter in inches and cooperating with the velocity scale V on the base plate 1. Three liquid flow indicator pointers including a gallons per minute (G. P. M.) pointer 10, a cubic feet per second (C. F. S.) pointer 11, a million gallons per day (M. G. D.) pointer 12, and an indicator pointer or the selected friction factor pointer N' are also provided on the portion 9 of maximum radius on the disc-like member 3.

The other scale C, Fig. 4, is graduated so as to indicate the ratio of liquid depth to pipe diameter when the pipe is not flowing full of liquid. The use of this scale C is illustrated in Fig. 1. Here the gallons per minute indicator pointer 10 is set at approximately 2080 gallons per minute which is for a full pipe. When the flow is only 410 (G. P. M.), the ratio of liquid depth to pipe diameter is found to be three-tenths (0.3) as indicated on scale C opposite 410 on the quantity scale Q. The practical use of scale C is demonstrated hereafter in connection with the description of scale D on top arm member 4, Fig. 5, and in the solution of an illustrative problem, scale C is arranged in relationship to the G. P. M. indicator 10 and is to be used only when the quantity of liquid flow is expressed in gallons per minute. When the quantity is expressed in units other than gallons per minute it should be converted to gallons per minute before using scale C. This conversion can readily be done as previously described. With the flow indicator pointers 10, 11 and 12 on the member 3, Figs. 1 and 4, set to indicate a given flow on the quantity scale Q on base plate 1, Figs. 1 and 2, and with the scale N, Figs. 1 and 3, set so that the N' indicator pointer, Fig. 4, indicates the selected friction factor on the N scale, the required pipe size for a given slope or the required slope for a given pipe size will be found adjacently on their respective scales. The reverse procedure is also applicable. In other words, if three of the factors of the four factors, quantity, pipe size, and slope and friction factor are known or assumed, the fourth can be readily determined.

The arm 4, Figs. 1 and 5, is mounted to rotate over the member 3 and comprises a radial arcuate section 15 having an outwardly extending radial ear or tab 13 on the peripheral edge thereof. This arm 4 is provided with a circular aperture or window 14 overlying and through which a portion of the indicia of the pipe diameter scale B on the disc-like member 3 may be viewed. A window indicator pointer 15' together with a scale D is also provided on the member 3. The arcuate section 15 of the arm 4 has the same radius as the portion 9' of least diameter of the member 3, whereby the outer circular peripheral edge thereof conforms closely to and cooperates with the pipe diameter scale B on member 3. The scale D indicates ratio of liquid depth to pipe diameter and is graduated so that when the window indicator pointer 15' is set for a given pipe size, which may be seen on scale B through the window 14, the velocity of liquid flow can be found opposite this ratio on the velocity scale V on the base plate 1, the ratio having been determined by the use of scale C on the member 3. Scales C and D of the gravity flow calculator are special features for analyzing flow conditions when the pipe is discharging less liquid than its designed capacity or in other words, when not flowing full. The advantages of these features are best demonstrated by describing the usual method of making such analyses.

With the usual type of chart selected for the appropriate friction factor the quantity of full pipe discharge and the velocity can be ascertained, if the pipe size and slope are known. To determine the velocity of lesser flows, an additional chart, a proportional flow chart, must be used. In using such a proportional flow chart the ratio of actual flow to full pipe flow is first computed. Then, entering the proportional flow chart at this ratio, the proportional velocity is found. By multiplying this proportional velocity by the full pipe velocity, the actual velocity for the lesser flow is determined. With the present gravity flow calculator, by setting the G. P. M. indicator pointer 10 on member 3 at the pipe full quantity and the window indicator 19 on arm 4 at the selected pipe size on scale B, the velocity of any lesser quantity can be read without making additional computations or further settings. This feature, in eliminating the objections to using first one chart and then another will eliminate the designer's temptation to omit the analysis under conditions of partially filled pipes. The omission of such analysis may result in the design of a sewer in which the velocities under certain conditions will not be sufficient to prevent the settling out of sewage solids.

The scales used on this form of the gravity flow calculator for pipes are graduated logarithmically along arcs of concentric circles in accordance with applicable variations of the well known Chezy formula $V = C\sqrt{RS}$. In the drawings, the variation of the Chezy formula which is used for the gravity flow calculator for pipes is known as the Manning formula:

$$V = \frac{1.486}{N} R^{2/3} S^{1/2}$$

The following formulae, tables, etc., are used in the design of the calculator or circular slide rule for use in the computation of problems related to the flow of liquids in pipes in gravity systems:

FORMULAE FOR FULL PIPE FLOW

1. $V = \frac{1.486}{N} R^{2/3} S^{1/2}$  } General
2. $Q = AV = A \frac{1.486}{N} R^{2/3} S^{1/2}$ For full pipes the formulae reduce to:

3. $V = \frac{1.486}{N} \left(\frac{D}{4}\right)^{2/3} S^{1/2}$

4. $Q = AV = \pi \left(\frac{D}{2}\right)^2 V = \pi \left(\frac{D}{2}\right)^2 \left(\frac{1.486}{N}\right) \left(\frac{D}{4}\right)^{2/3} S^{1/2}$ $= \frac{3.1416}{4} \times \frac{1.486}{N} \times \frac{D^{8/3}}{2.5198} \times S^{1/2}$ 5. $= 0.46317 \times \frac{D^{8/3}}{N} \times S^{1/2}$ C. F. S. (cubic feet per second)

6. $= 207.884 \times \frac{D^{8/3}}{N} \times S^{1/2}$ G. P. M. (gallons per minute)

7. $= 0.29935 \times \frac{D^{8/3}}{N} \times S^{1/2}$ M. G. D. (million gallons per day)

8. $V = \frac{Q}{\pi \left(\frac{D}{2}\right)^2} = \frac{4}{\pi} \frac{Q}{D^2}$ wherein V = Velocity in feet per second
N = Friction factor
R = Hydraulic radius
S = Slope in feet per foot
D = Pipe diameter in feet
A = Cross-sectional area of pipe in square feet
Q = Quantity of flow in C. F. S. unless otherwise stated

Computation table (A)

| (1) D (inches) | (2) D (Ft.) | (3) Log D | (4) Log D² | (5) Log D^{8/3} |
|---|---|---|---|---|
| 4 | 0.3333 | 9.52284-10 | 9.04568-10 | 8.72757-10 |
| 6 | 0.5000 | 9.69897-10 | 9.39794-10 | 9.19725-10 |
| 8 | 0.6667 | 9.82393-10 | 9.64786-10 | 9.53048-10 |
| 10 | 0.8333 | 9.92080-10 | 9.84160-10 | 9.78280-10 |
| 12 | 1.0000 | .00000 | .00000 | .00000 |
| etc. | etc. | etc. | etc. | etc. |

Computation table (B)

| (1) Number | (2) Logarithm | (3) 1/2 Logarithm |
|---|---|---|
| 1.00 | .00000 | .00000 |
| 1.10 | .04139 | .02070 |
| 1.20 | .07918 | .03959 |
| 1.30 | .11394 | .05697 |
| 1.40 | .14613 | .07307 |
| 1.50 | .17609 | .08805 |
| etc. | etc. | etc. |

FORMULAE FOR LESS THAN FULL PIPE FLOW

The formulae for R and A, hydraulic radius and cross-sectional liquid area, respectively, and other relationships when the pipe is flowing less than full, may be determined by visualizing two general conditions, namely, the pipe more than half full and the pipe less than half full and by letting:

X = Liquid depth
D = Pipe diameter
P = Wetted perimeter
$2\phi$ = The central angle between the radii which terminate at the surface of the liquid
A = Cross-sectional area of the liquid
Z = Area of the sector bounded by the two radii forming angle $2\phi$
T = Area of the triangle bounded by the two radii forming angle $2\phi$
R = Hydraulic radius = A ÷ P
r = Radius of the pipe Also, let $r$, the pipe radius, be taken as the unit of measure, i. e., $r = 1$, so that, for convenience, $r$ can be omitted from the formulae wherever it would occur without affecting the generality of the formulae.
Then $$Z = \frac{2\phi \pi r^2}{360} = 0.017453\phi$$

$$T = r \sin \phi \, r \cos \phi = \sin \phi \cos \phi$$

and when the pipe is more than half full

A = Area of the circle − area of the sector + area of the triangle $= \pi r^2 - Z + T$
$= 3.1416 - 0.017453\phi + \sin \phi \cos \phi$ $$P = 2\pi r - \frac{2\phi 2\pi r}{360} = 6.2832 - 0.034906\phi$$

$$\cos \phi = \frac{X - r}{r} = \frac{X}{r} - 1 = \frac{2X}{D} - 1$$

$$\phi = \cos^{-1}\left(\frac{2X}{D} - 1\right)$$

and when the pipe is less than half full $$A = Z - T = 0.017453\phi - \sin\phi\cos\phi$$

$$P = \frac{2\phi 2\pi r}{360} = 0.034906\phi$$

$$\cos\phi = \frac{r-X}{r} = 1 - \frac{X}{r} = 1 - \frac{2X}{D}$$

$$\phi = \cos^{-1}\left(1 - \frac{2X}{D}\right)$$

From the above formulae and relations, table (C) is computed.

*Computation table (C)*

| (1) $\frac{X}{D}$ | (2) $\cos\phi$ | (3) $\phi$ | (4) Sine $\phi$ | (5) T | (6) Z | (7) A | (8) P | (9) $\frac{X}{D}$ | (10) R | (11) Log R | (12) 2/3 Log R | (13) Log A | (14) Log 2/3 R + Log A |
|---|---|---|---|---|---|---|---|---|---|---|---|---|---|
| 1.0 | 1.0 | 0.00 | 0.0 | 0.0 | 0.0 | 3.1416 | 6.2832 | 1.0 | 0.5 | 9.69897-10 | 9.79031-10 | 0.49715 | 0.29646 |
| 0.9 | 0.8 | 36.8667 | 0.59995 | 0.47996 | 0.64343 | 2.97813 | 4.99634 | 0.9 | 0.596 | 9.77525.10 | 9.85017-10 | 0.47394 | 0.32411 |
| 0.8 | 0.6 | 53.1333 | 0.80006 | 0.92734 | 0.92428 | 2.69428 | 4.42852 | 0.8 | 0.608 | 9.78390-10 | 9.85593-10 | 0.43043 | 0.28636 |
| 0.7 | 0.4 | 66.4167 | 0.91648 | 0.36659 | 1.15919 | 2.34900 | 3.96484 | 0.7 | 0.592 | 9.77232-10 | 9.84821-10 | 0.37088 | 0.21909 |
| 0.6 | 0.2 | 78.4667 | 0.97981 | 0.19596 | 1.36048 | 1.96808 | 3.54424 | 0.6 | 0.555 | 9.74429-10 | 9.82953-10 | 0.29405 | 0.12358 |
| 0.5 | 0.0 | 90.0000 | 1.00000 | 0.00000 | 1.57080 | 1.57080 | 3.14160 | 0.5 | 0.5 | 9.69897-10 | 9.79031-10 | 0.19612 | 9.99543-10 |
| etc. | etc. | etc. | etc. | etc. | etc. | etc. | etc. | etc. | etc. | etc. | etc. | etc. | etc. |

The graduations of the various scales and their placement on the drawings so as to bear correct interrelationship in the gravity flow calculator is as follows:

The quantity being of the first power in No. 4 of the formula for full pipe flow, the quantity scale Q is graduated on the base plate 1, Fig. 2, in proportion to the logarithm of Q (column 2, computation table B) and is arranged to suit convenience. The velocity also being of the first power in No. 4 of the formula for full pipe flow, the velocity scale V is likewise graduated on base plate 1, Fig. 2, in proportion to the logarithm of V (column 2, computation table B). The velocity scale V is placed inside the quantity scale Q near the large quantities shown on quantity scale Q so as to avoid its being covered when the slope scale S is being used. D, being to the 8/3 power in Nos. 5, 6 and 7 of the formulae for full pipe flow, scale A is graduated on the base plate 1, in proportion to 8/3 times the logarithm of D (column 5, computation table A). Scale A is placed with smaller sizes near the large quantities shown on the quantity scale Q, so as to avoid the portion of the quantity scale Q under consideration being covered when the slope scale S is being used.

S, being to the 1/2 power in the formulae, the slope scale S is graduated on the member 2, in proportion to 1/2 the logarithm of S (column 3, computation table B) and is placed to suit convenience. As N is to the first power in the formulae, the N scale is graduated on the member 2, in proportion to the logarithm of N (column 2, computation table B). The N scale is placed to suit convenience, but is graduated in reverse direction from the aforementioned graduations because of the fact that N appears in the denominator of the formula.

In determining the positions of the indicators and scales on the disc member 3, so that they bear proper relationship to the scales heretofore mentioned, the scales on base plate 1 are repeated on Fig. 1 in the same relative position. The scales on the member 2, are also repeated on Fig. 1 in such a manner that 1.0 on the slope scale S is opposite 12 on scale A. The indicator pointer N' is drawn on member 3, Fig. 1, opposite .010 on the N. scale. The G. P. M., C. F. S. and M. G. D indicator pointers are drawn on member 3, Fig. 1, opposite the quantities obtained by substituting 1 for D (12 inches), .01 for S (1.0 foot per 100), and .010 for N in Nos. 5, 6 and 7 of the formulae, respectively, and as indicated on the Q scale. The velocity in cubic feet per second (C. F. S.), determined by No. 8 of the full pipe flow formulae for this flow and a twelve inch pipe is 5.9 feet per second.

The point which represents 5.9 on the velocity scale V is taken as the zero point or starting point for scale B, the logarithm being zero when D equals 1. As D appears to the second power in No. 8 of the formulae for full pipe flow, scale B is graduated in proportion to two times the logarithm of D (column 4, computation table B) and is graduated in reverse direction from the velocity scale V because D appears in the denominator No. 8 of the formulae. The indicators and scale B thus drawn on Fig. 1 are transferred to the disc member 3.

Scale C is used to determine the ratio of liquid depth to pipe diameter $$\frac{X}{D}$$

as the quantity diminishes from full pipe flow. No. 2 of the formula for full pipe flow is used in graduating scale C, substituting for Q the proper value of $$\frac{X}{D}$$

In the formula, Q is directly proportional to $AR^{2/3}$, S and N remaining constant when scale C is in use. In the computation table C, the values of A and R are established for various values $$\frac{X}{D}$$

Scale C is therefore graduated in proportion to the sum of the logarithm of A plus 2/3 the logarithm of R, as set in column 14, computation table C.

In doing this, Q is in reality plotted but instead of assigning values of Q to the various graduations, the values of $$\frac{X}{D}$$

for the corresponding A and R are assigned. The G. P. M. indicator pointer 10 is taken as the starting point of the plotting of scale C and is assigned the value of 1.0 for $$\frac{X}{D}$$

For this reason, the quantity must be expressed in gallons per minute when using scale C. However, scale C can be plotted in reference to any one of the three flow indicator pointers, this being a matter of choice and convenience depending upon the units of flow that may be expected to be the most frequently used. Scale D on the arm 4 is used to determine the velocity when the pipe is not flowing full. No. 1 of the formula for full pipe flow is used and scale D is graduated in proportion to 2/3 the logarithm of R, but instead of assigning values of V to the graduations the corresponding values of $$\frac{V}{D}$$

are assigned in accordance with the computation table C.

In operation of the gravity flow calculator, the gallons per minute (G. P. M.), cubic feet per second (C. F. S.) or the million gallons per day (M. G. D.) indicator pointer, depending upon the units in which quantity is expressed, is first set, to the quantity under consideration on the quantity scale Q. The N scale is next set so that the appropriate N for the class of pipe under consideration will be opposite the N' indicator pointer. After these two settings are made the slopes required to discharge the indicated quantity when the pipe flows full will be found on the slope scale S opposite the various pipe sizes on scale A or vice versa. The velocities will be found on the velocity scales V opposite the various pipe sizes shown on scale B.

For analysis as to changes in velocity when the quantity is less than pipe full capacity, find the ratio of liquid depth to pipe diameter on scale C opposite the actual quantity. In using scale C quantities must be expressed in gallons per minute. The scale D is then referred to and the window indicator 15' is set to the size of pipe under consideration. The velocity will be found on the velocity scale V opposite any ratio of liquid depth to pipe diameter shown on scale D. For other combinations of known factors, the unknown factors can be readily determined by reversing the above procedure.

Illustrative example of a problem for the gravity flow calculator:

For a flow of 2080 gallons per minute, a slope of 1.0 foot per 100 and N equal to .010, determine the required pipe size and the velocity; also determine the velocity when the flow drops to 410 gallons per minute.

*Solution.*—As illustrated in Fig. 1, set the G. P. M. indicator pointer 10 to 2080 gallons per minute on the quantity scale Q and set .010 on the N scale opposite the N' indicator pointer. The required pipe size is found to be 12 inches on scale A opposite 1.0 and the slope scale S. The velocity is found to be 5.9 feet per second on the velocity scale V opposite 12 inches on scale B. Opposite 410 gallons per minute on the quantity scale Q the ratio of liquid depth to pipe diameter is found to be three tenths (0.3) on scale C. With the window indicator 15' set to 12 inches on scale B the velocity for this flow is found to be 4.5 feet per second on the velocity scale V opposite .3 on scale D.

In graduating the scales as applied to both the gravity flow and pressure flow calculators, the quantity scale Q is used as a base and its selected diameter is 4 inches or 16 on the "40" engineer scale. Two other diameters are also selected for convenience. They are 13.6 and 22.4 on the "40" engineer scale. The scales on the calculator are plotted logarithmically along the perimeters of concentric circles whose diameters are the three selected. A logarithmic scale is prepared for this plotting as follows: subscribe 3 concentric arcs whose diameters are the same length as the diameters selected for the calculator scales. Intercept 72° on these arcs. Divide each into ten equal parts and subdivide one of the end parts into ten equal parts. These arc lengths represent the mantissas of logarithms. By the use of dividers and these arcs the logarithms are plotted on the calculator drawings.

Figs. 7 to 12, inclusive, are directed to the pressure flow calculator including a base plate 1', shown in detail in Fig. 8, a substantially semi-disc like intermediate member 2' shown in detail in Fig. 9, a disc member 3' shown in detail in Fig. 10, and a radially extending arm 4" shown in detail in Fig. 11.

The base plate 1' shown in Fig. 8 corresponds to the base plate 1, Fig. 2, described for the gravity flow calculator. The intermediate quantity scale Q on the base plate 1' is identical with the corresponding scale Q on Fig. 2. The inner velocity scale V' is the same as that on Fig. 2 except for the omission of some of the intermediate graduations. The outer pipe diameter scale A' is substantially the same as that on Fig. 2 but is graduated to represent the pipe sizes which are commonly used in water supply systems and is also graduated to conform to the applicable pressure flow formula. The substantially semi-disc-like member 2', Figs. 7 and 9, of the pressure flow calculator corresponds to the intermediate disc section 2 shown in Fig. 2 for the gravity flow calculator for pipes. This member 2' is provided with similar recesses 5' and 6' as the member 2 of the gravity flow calculator and has a finger engaging portion 8' which extends radially outwardly from a tongue 7" provided on one side of the member 2'. The outer scale H on the member 2' is the hydraulic gradient scale, instead of the slope scale S on the member 2 as in the gravity flow calculator, and represents friction loss in feet per thousand. The inner scale C' is the friction factor scale. The radius of the member 2' is sufficient that its circumference falls just inside of the pipe diameter scale A' on the base plate 1'. The recess 5' having the greatest width on one edge of member 2', overlies the quantity scale Q' on the base plate 1', and permits this scale Q' to be read therethrough; and, the recess 6' on the other edge of the member 2' overlies the velocity scale V' on the base plate 1' and permits this scale V' to be read therethrough.

The disc member 3' shown in detail in Fig. 10 has the same form as the disc member 3 of the gravity flow calculator and is provided with portions 16 and 16' having different radius and with three flow indicator pointers including a G. P. M. pointer 10', a C. F. S. pointer 11', a M. G. D. pointer 12' and a C''' indicator pointer for the selected friction factor provided on the portion 16. The scale B' around the periphery of the portion 16" represents pipe diameter in inches. A tab T" is also provided on the member 3' for rotating it about its pivot.

The arm 4", Figs. 7 and 11, is mounted to rotate over the disc member 3', Figs. 7 and 10, and comprises a radially extending substantially V-shaped section having a radially outwardly extending arm or tab 13' on one peripheral edge thereof. A short arcuate slot or window 17 with a circular aperture or window 14' adjacent to one end thereof, a scale E representing friction loss in feet per thousand is inscribed along and adjacent to the outer side edge of the arcuate slot 17 of the arm and a window indicator pointer 17' is also provided on the arm 4".

The substantially V-shaped section of the arm 4'' has a radius that the outer circular peripheral edge thereof extends beyond the pipe diameter scale A' on the base plate 1' with the arcuate window 17 overlying and through and which a portion of the hydraulic gradient scale H on the semi-disc-like member 2' may be viewed and the circular window 14' overlying and through which a portion of the pipe diameter scale A' on the base plate 1' may be viewed. With the flow indicator pointers 10', 11' and 12' on the intermediate disc member 3', Figs. 7 and 10, set to indicate a given flow and with the C'' scale, Figs. 1 and 9, set so that the indicator pointer C''' on Figs. 7 and 10 indicates the selected friction factor, the required pipe sizes for a given hydraulic gradient or the required hydraulic gradient for a given size pipe will be found adjacently on the respective scales. The reverse procedure also may be applied. In other words, if three of the four factors, quantity, pipe size, hydraulic gradient and friction factor are known, or assumed, the fourth can be readily determined. Scale E on the index arm 4'', Figs. 1 and 11, represents pipe length. It is for use in connection with the hydraulic gradient scale H on the member 2', Figs. 1 and 9, and is graduated so that when the indicia is set to correspond to the hydraulic gradient, the total friction loss can be determined for any length of pipe. The total friction loss will be found on the hydraulic gradient scale H opposite the pipe length on scale E, the decimal point having to be mentally placed or if the total friction loss is known, the hydraulic gradient can be determined by the reverse procedure. This scale E on the member 4'' is a special feature which adds advantages to the pressure flow calculator not offered by flow charts or other methods of computing flows. The total friction loss in a pipe flowing under pressure is determined by multiplying the hydraulic gradient by the pipe length; or the hydraulic gradient is determined by dividing the total friction loss by the pipe length. Such computations, when flow tables or charts are used, are made by the use of a slide rule or the ordinary methods of long division and multiplication. These computations are quickly accomplished with the calculator by the use of scale E, thus making the calculator complete within itself, with obvious advantages.

The following formulae, tables, etc., are used in the design of the calculator or circular slide rule for use in the computation of problems related to the flow of liquid in pipes in pressure systems.

The scales for the pressure flow calculator are based on the Hazen and Williams variation of the well known Chezy formula: $V = CR^{1/2}S^{1/2}$. In the Chezy formula V represents velocity, R represents the hydraulic radius (cross-sectional area of liquid divided by the wetted perimeter), S is the hydraulic gradient or slope and C is an experimentally determined constant which takes into consideration friction coefficient and other influencing factors.

HAZEN AND WILLIAMS VARIATION OF CHEZY FORMULA FOR PRESSURE FLOW CALCULATOR (1) $V = 1.318 C R^{.63} S^{.54} = 1.318 C \left(\dfrac{D}{4}\right)^{.63} S^{.54}$
$= 0.5503 C D^{.63} S^{.54}$ also (2) $V = \dfrac{Q}{A} = \dfrac{4Q}{\pi D^2}$ (3) $Q = VA = 0.5503 C D^{.63} S^{.54} \dfrac{\pi D^2}{4}$ (4) $= 0.4322 \, CD^{2.63} S^{.54}$ C. F. S.
(cubic feet per second)

(5) $= 1.9397 \, CD^{2.63} S^{.54}$ G. P. M.
(Gallons per minute)

(6) $= 0.002793 \, CD^{2.63} S^{.54}$ M. G. D.
(Million gallons per day)

wherein

V = Velocity in feet per second
Q = Quantity in cubic feet per second
D = Diameter of pipe feet

*Computation table (E) (for pressure flow calculator)*

PIPE DIAMETER

| (1) | (2) | (3) | (4) | (5) |
|---|---|---|---|---|
| d (inches) Nominal | D (feet) Actual | Log. D | Log. D² | Log. D²·⁶³ |
| 2 | 0.1725 | 9.23679−10 | 8.47358−10 | 7.99276−10 |
| 2½ | 0.2058 | 9.31345−10 | 8.62690−10 | 8.15437−10 |
| 3 | 0.25 | 9.39794−10 | 8.79588−10 | 8.41658−10 |
| 4 | 0.3333 | 9.52284−10 | 9.04568−10 | 8.74507−10 |
| 5 | 0.4167 | 9.61982−10 | 9.23964−10 | 9.00013−10 |
| 6 | 0.5000 | 9.69897−10 | 9.39794−10 | 9.20829−10 |
| 8 | 0.6667 | 9.82393−10 | 9.64786−10 | 9.53694−10 |
| 10 | 0.8333 | 9.92080−10 | 9.84160−10 | 9.79170−10 |
| 12 | 1.0 | 0.0000 | 0.0000 | 0.00000 |
| etc. | etc. | etc. | etc. | etc. |

In the operation of the pressure flow calculator shown in Figs. 7 to 12, inclusive:

The gallons per minute, cubic feet per second, or the million gallons per day indicator, depending upon the units in which quantity is expressed, is set on the quantity scale Q' to the quantity under consideration, Figs. 7 and 8. The C'' scale, Figs. 7 and 9, is then set so that the appropriate C for the class of pipe under consideration will be opposite the C''' indicator. When these two settings are made the hydraulic gradient required to discharge the indicated quantity will be found opposite the various pipe sizes on scale A' or vice versa. 1.0 is then set on scale E, Figs. 7 and 11, to the hydraulic gradient. The total friction loss will be found on the hydraulic gradient scale H opposite the pipe length as graduated on scale E, the decimal point being mentally placed. The velocity will be found on the velocity scale V' opposite the various pipe sizes shown on scale B', Figs. 7 and 10.

For other combinations of known factors, the unknown factors can be readily determined by reversing the procedure.

Illustrative of example in solving a problem with the pressure flow calculator:

For a flow of 1,000 gallons per minute, a pipe friction coefficient, C, of 100, an available head of 50 feet for friction loss and a pipe length of 5,000 feet, determine the hydraulic gradient, the required pipe size, and the velocity.

*Solution.*—As illustrated in Fig. 7, set the G. P. M. indicator 10' on disc 3' to 1,000 gallons per minute on the quantity scale Q', base plate 1', set member 2' so that 100 on scale C'' will be opposite the indicator pointer C''' and set 5 on scale E, top member 4'', opposite 50 on the hydraulic gradient scale H. Opposite 1.0 on scale E, the hydraulic gradient will be found to be 10 feet per thousand on the hydraulic gradient scale and the required pipe diameter will be found to be 10 inches on scale A', base plate 1', opposite 10 on the hydraulic gradient scale. The velocity is found to be 4.1 feet per second on the velocity scale V' opposite 10 inches on scale B', disc member 3'.

The advantages of the gravity flow calculator and the pressure flow calculator for pipes are described under the following headings: General advantages and Special advantages.

General advantages

1. The calculator rapidly solves problems involving liquid flow in pipes. The time required to set known factors into the calculator is a matter of seconds as evident from the directions for use outlined above. When this is done, a complete picture of the related unknown factors is presented, thus eliminating the necessity for numerous trial computations. Present methods of making these computations require the use of logarithms, a log log slide rule, flow tables, or flow charts. The method in current use which could compare most favorably with the calculators as regards speed is the use of flow charts. Flow charts, however, lack the special feature as well as a number of other advantages which the calculators present.

2. The calculator is accurate. It is not claimed to be as accurate as the use of logarithms but such refinement is not required in practice and is seldom used. The various scales on the calculator are laid off so as to produce an accuracy which is well within the limits of the accuracy of assuming the quantity of flow or of determining the coefficient of friction. When the calculators are once set, no further resetting and sliding of scales back and forth is necessary as is the case with a log log slide rule, thus reducing the chances of error. Flow tables can be as accurate as the formula by which they are computed, but they are inconvenient to use, generally requiring interpolation or multiplication by some factor or both. On flow charts the related factors are widely separated and the use of guide lines or a straight edge is necessary in reading the chart. On the calculators the related factors are on adjacent scales, making the reading easier and more accurate.

3. The calculators have a wide range of operations. In the drawings, as prepared for the two types of the calculator, the range covers all pipe sizes, quantities, velocities, slopes, etc., normally required in practice and many that are only rarely required. In addition, the friction factor scale, with its relatively wide range, makes it possible for the calculator to take the place of many flow charts, one for each of the various friction factors.

4. The calculator is compact and of convenient size. The drawings as prepared indicate a size of substantially 6 inches square. Each flow chart prepared for the various friction coefficients, if prepared in the customary manner on logarithmic cross-section paper, and if given the range and degree of accuracy of the calculators, would be approximately six times as large. Charts of such size are inconvenient to use and to file.

Special advantages

The advantages described above are general for both types of the calculator. In addition to these general advantages each type of the calculator has a special feature which flow charts do not have. The advantages of these special features have been previously described.

Having thus described my invention, what I claim as new and wish to secure by Letters Patent is:

1. In a calculator, a base having a plurality of scales thereon graduated logarithmically along arcs of concentric circles, a substantially semi-circular disc section, a disc member and a radial arm concentrically and rotatably mounted on said base, an outer scale graduated about the outer edge of said disc section and cooperating with one of said scales on the base and an inner scale adjacent to said outer scale provided on the disc section, said disc member having a portion of maximum radius and a portion of minimum radius, a scale on said portion of minimum radius cooperating with another scale on said base and indicator pointers provided on said portion of maximum radius, certain of said indicator pointers cooperating with a third scale on said base and another of said indicating pointers cooperating with the inner scale on said disc section, said radial arm having windows therein, one of said windows overlying the outer scale of said disc section and another of said windows overlying the first-mentioned scale of said base, a scale provided on said arm adjacent to the window overlying the outer scale of the disc section, said scale on the arm cooperating with the outer scale on the disc section through said last-mentioned window, whereby upon the rotation of said disc section, disc member and radial arm with respect to each other and with said base in a certain relation correlated values are indicated by said scales and pointers.

2. In a calculator, a base having a plurality of scales thereon graduated logarithmically along arcs of concentric circles, a substantially semi-circular disc section, a disc member and a radial arm concentrically and rotatably mounted on said base, an outer scale graduated about the outer edge of said disc section and cooperating with one of said scales on the base and an inner scale adjacent to said outer scale provided on the disc section, said disc member having a portion of maximum radius and a portion of minimum radius, a scale on said portion of minimum radius cooperating with another scale on said base and indicator pointers provided on said portion of maximum radius, certain of said indicator pointers cooperating with a third scale on said base and another of said indicating pointers cooperating with the inner scale on said disc section, said radial arm having a circular window and an arcuate window therein, one of said windows overlying the outer scale of said disc section and another of said windows overlying the first-mentioned scale of said base, a scale provided on said arm adjacent to the window overlying the outer scale of the disc section, said scale on the arm cooperating with the outer scale on the disc section through said last-mentioned window, whereby upon the rotation of said disc section, disc member and radial arm with respect to each other and with said base in a certain relation correlated values are indicated by said scales and pointers.

3. In a pressure flow calculator for solving problems relating to flow of liquids in pipes, a base having a plurality of scales graduated logarithmically along arcs of concentric circles, said scales including an outer scale graduated in inches representing the diameter of pipes, an intermediate scale graduated to represent quantity of liquid flow through the pipes in gallons per minute, cubic feet per second and millions of gallons per day and an inner scale graduated to represent velocity of liquid flow in feet per second, a substantially semi-circular disc section including an arcuate outer edge, said disc section concentrically and rotatably mounted on said base, inner and outer concentric scales provided on said disc section, said last-mentioned outer scale arranged about the outer edge of the disc section and graduated to represent hydraulic gradient in feet per thousand and said last-mentioned inner scale graduated to represent friction factors, said arcuate outer edge of the disc section lying adjacent to the outer scale on said base, said hydraulic gradient scale on the disc section cooperating with said outer scale on said base, a third disc member concentrically mounted above said disc section, said third disc member having a pipe diameter scale thereon and indicator pointers, an arm concentrically mounted on said third disc member, a window in said arm and a scale on said arm adjacent to said window, said scale on said arm cooperating with said gradient scale through said window.

4. In a calculator, a base having a plurality of scales thereon graduated logarithmically along arcs of concentric circles, a substantially semicircular disc section, a disc member and a radial arm concentrically and rotatably mounted on said base, an outer scale graduated about the outer edge of said disc section and cooperating with one of said scales on the base and an inner scale adjacent to said outer scale provided on the disc section, said disc member having a portion of maximum radius and a portion of minimum radius, a scale on said portion of minimum radius co-operating with another scale on said base and indicator pointers provided on said portion of maximum radius, certain of said indicator pointers cooperating with a third scale on said base and another of said indicating pointers cooperating with the inner scale on said disc section, said radial arm having a circular window and an arcuate window therein, one of said windows overlying the outer scale of said disc section and another of said windows overlying the first-mentioned scale of said base, a scale provided on said arm adjacent to the window overlying the outer scale of the disc section, said scale on the arm cooperating with the outer scale on the disc section through said last-mentioned window whereby upon the rotation of said disc section, disc member and radial arm with respect to each other and with said base in a certain relation correlated values are indicated by said scales and pointers, and a finger engaging portion on each of said disc section, disc member and radial arm to effect rotation thereof relative to each other on the base.

5. In a calculator, a base having a plurality of scales thereon graduated logarithmically along arcs of concentric circles, said scales including an outer scale, an inner scale and an intermediate scale, a disc section including an arcuate outer edge, said disc section concentrically and rotatably mounted on said base, a scale graduated about the outer edge of said disc section and an inner scale graduated on said disc section adjacent to said last-mentioned scale, the outer arcuate edge of said disc section lying adjacent to the outer scale on said base, said scale in the outer edge of said disc section cooperating with the outer scale of said base, a third disc member above said disc section and mounted to move with respect to said member, disc section and base, said third disc member having an arcuate portion of maximum radius and an arcuate portion of minimum radius, a scale and indicator pointers provided on said arcuate portion of maximum radius of said disc member and a scale graduated on the arcuate portion of minimum radius of said disc member, said arcuate portion of maximum radius of the disc member lying adjacent to the inner portion of the intermediate scale on said base and the inner portion of the inner scale on said disc section, said scale on the arcuate portion of maximum radius of the disc member cooperating with the intermediate scale on the base and said arcuate portion of minimum radius of the disc member lying adjacent to the inner portion of the inner scale of the base, said scale on the arcuate portion of minimum radius of the disc member cooperating with the inner scale of said base, certain of said indicator pointers on the arcuate portion of maximum radius of the disc member cooperating with the intermediate scale of said base and another of said indicator pointers cooperating with said inner scale of the disc section, a radial arm including an arcuate section movably mounted about the center of said disc member, said arcuate section of the arm having a radius equal to the radius of said arcuate portion of minimum radius of the disc member, a scale graduated on the peripheral edge of said arcuate section, and cooperating with said inner scale of the base, a window in said arm through which graduations of the scale on the arcuate portion of minimum radius of the disc member may be viewed and an index on said arm, said index adapted to indicate a selected graduation on said last-mentioned scale.

6. In a calculator, a base having a plurality of scales graduated logarithmically along arcs of concentric circles, said scales including an outer scale, an inner scale and an intermediate scale, a disc section including an arcuate outer edge and having cut-out portions formed in the side edges thereof adjacent to the arcuate outer edge, one of said cut-out portions having a greater width and formed closer to the arcuate outer edge of the disc section than another of the cut-out portions, said disc section concentrically and rotatably mounted on said base, a scale graduated along the outer edge of said disc section and a scale graduated on the disc section intermediate said cut-out portions, the outer arcuate edge of said disc section lying adjacent to outer scale on said base, said outer scale of said disc section cooperating with the outer scale on said base, said cut-out portion having the greatest width overlying the intermediate scale of said base and said cut-out portions having the least width overlying the inner scale of said base, a third disc member above said disc section and concentrically mounted to move with respect to said base and disc section, said disc member having an arcuate portion of maximum radius and an arcuate portion of minimum radius, a scale and indicator pointers provided on said arcuate portion of maximum radius and a scale graduated on the arcuate portion of minimum radius, said arcuate portion of maximum radius lying adjacent to the inner portion of the intermediate scale on said base and adjacent to the inner portion of the inner scale on said disc section, said scale on the arcuate portion of maximum radius of the disc member cooperating with the intermediate scale on the base and said arcuate portion of the minimum radius lying adjacent to the inner portion of the inner scale of the base, said scale on the arcuate portion of minimum radius cooperating with the inner scale of the base, certain of said indicator pointers cooperating with the intermediate scale of said base and another of said indicator pointers cooperating with said inner scale of the disc section, a radial arm including an arcuate section movably mounted about the center of said disc member, said arm having a radius equal to the radius of the arcuate portion of minimum radius of the disc member, a scale graduated on the peripheral edge of the arcuate section of said arm and cooperating with said inner scale of the base, a window in said arm through which graduations of the scale on the arcuate portion of minimum radius of the disc member may be viewed, an index on said arm, said index adapted to indicate a selected graduation on said last-mentioned scale.

7. In a gravity flow calculator for solving problems relating to flow of liquids through pipes, a base having a plurality of scales graduated logarithmically along arcs of concentric circles, said scales including an outer scale graduated in inches representing the diameter of pipes, an intermediate scale graduated to represent quantity of liquid flow through the pipes in gallons per minute, cubic feet per second and millions of gallons per day and an inner scale graduated to represent velocity of liquid flow in feet per second, a disc section including an arcuate outer edge, said disc section concentrically and rotatably mounted on said base, inner and outer concentric scales provided on said disc section, said last-mentioned outer scale arranged about the arcuate outer edge of the disc section and graduated to represent the slope of the pipes in feet per hundred and said last-mentioned inner scale graduated to represent friction factors, said arcuate outer edge of the disc section lying adjacent to the outer scale on said base, said slope scale on the outer edge of said disc section cooperating with said outer scale of said base, a third disc member above said disc section and concentrically mounted to move with respect to said disc section and base, said third disc member having an arcuate portion of maximum radius and an arcuate portion of minimum radius, a scale and indicator pointers provided on said arcuate portion of maximum radius, said last-mentioned scale cooperating with said intermediate quantity of flow scale on said base and graduated to represent ratio of liquid depth in the pipes to pipe diameter when the liquid flow is not full in the pipes, certain of said indicator pointers designating flow of the liquid in the pipes in gallons per minute, cubic feet per second and millions of gallons per day and cooperating with said intermediate quantity scale of said base and another of said indicator pointers cooperating with and designating the selected friction factor on the inner friction factor scale of said disc section, said scale on the arcuate portion of the minimum radius of the disc member cooperating with the inner velocity scale on said base and graduated to represent pipe diameter in inches, a radial arm including an arcuate section movably mounted about the center of said disc member, said arcuate section of the arm having a radius equal to the radius of said arcuate portion of minimum radius of the disc member, a scale provided on the peripheral edge of the arcuate arm section, said last-mentioned scale cooperating with said inner velocity scale on said base and graduated to indicate ratio of liquid depth to a certain size pipe with the ratio having been determined by the scale on the arcuate portion of maximum radius of the disc member, a window in said arm through which graduations of the pipe diameter scale on the arcuate portion of minimum radius on the disc member may be viewed and an index on said arm, said index adapted to indicate a selected graduation on said last-mentioned scale.

JAMES W. FEILD.

REFERENCES CITED

The following references are of record in the file of this patent:

UNITED STATES PATENTS

| Number | Name | Date |
|---|---|---|
| 1,312,797 | Mayer | Aug. 12, 1919 |
| 2,328,881 | Saunders | Sept. 1943 |
| 2,393,922 | McDowell | Jan. 29, 1946 |
| 2,394,226 | Baldocchi | Feb. 5, 1946 |